March 12, 1929.   K. CONNELL   1,704,727
COMPOSITION FOR THERAPEUTIC USES
Filed Jan. 17, 1925

EACH DIVISION WILL CHARGE 100 CU.FT. AT 5 PARTS PER MILLION FOR ONE HOUR

INVENTOR
Karl Connell
BY
Mayer, Warfield and Wilson
ATTORNEYS

Patented Mar. 12, 1929.

1,704,727

UNITED STATES PATENT OFFICE.

KARL CONNELL, OF BRANCH, NEW YORK.

COMPOSITION FOR THERAPEUTIC USES.

Application filed January 17, 1925. Serial No. 2,994.

This invention relates to a composition and a process for the liberation of chlorine for purposes of therapeutical administration.

An object of the invention is to provide a composition and process for the liberation of chlorine in an effective therapeutic concentration, particularly adapted for the treatment of colds, influenza and like diseases.

Another object of the invention is to provide a composition which will not only yield an effective therapeutic concentration but which will also maintain such concentration over a period of time which will give the proper therapeutic exposure.

Another object of the invention is to provide a composition which may be readily packaged and simple in method of utilization.

Further objects of the invention are to provide a composition by means of which the utilization of chlorine therapeutically may readily be accomplished in hospitals, clinics and homes; which will remain stable until an occasion for its employment arises; and which will yield a proper concentration of chlorine with respect to the chamber or room in which administration takes place.

Other objects of the invention will in part be obvious and will in part appear hereinafter.

The invention accordingly comprises a composition possessing the characteristics, properties and relation of constituents, and a process comprising the several steps and the relation and order of one or more of such steps with respect to each of the others, which are exemplified in the composition and process hereinafter described, and the scope of the application of which will be indicated in the claims.

In the practice of the invention there is provided a composition by means of which, liberation of chlorine through chemical reaction may be regulated so that a therapeutic chamber of given dimension may be rapidly charged to a proper therapeutic concentration and maintained at such concentration for a proper period of therapeutic exposure time by a lower and graded liberation which will compensate for the natural losses from the atmosphere of the chamber.

The evolution of chlorine may be accomplished by the interaction of a chlorine liberator and a mineral acid under the influence of heat. To control the rate of liberation only such portion of the surface of the chlorine liberator is presented to immediate interaction with the acid as will yield a proper primary charge of chlorine, for example five parts of chlorine by volume per million parts of air. The remainder of the surface of the chlorine liberator is withheld from immediate interaction by a protective intercoating, which may be, by way of illustration, an unacted upon metal, as lead foil; a gummy substance as colophony, shellac; copal asphalt; pitch; or an inactive salt composition, that is, a salt which is insoluble in the acid medium and which may be applied by admixture with a binding agent, such as a gum, or sodium silicate. The ratio between the immediately interacting portion and the protected portion is such that reaction, after consumption of the unprotected portion, proceeds centrally into the protected portion at such slower rate as will compensate for the chlorine losses from the therapeutic chamber by absorption and escapement.

As the mineral acid medium, there may be employed various concentrations of hydrochloric acid, sulphuric acid and phosphoric acid.

The chlorine liberator when using hydrochloric acid as the acid medium, may be an oxidizing agent such as, for example, potassium chlorate, potassium permanganate, potassium chromate, potassium dichromate and corresponding salts of other metals, manganese dioxide and lead dioxide, and when using an acid medium other than hydrochloric acid it may contain an oxidizing agent, for example, those above enumerated and a chloride, as the alkali metal and alkaline earth metal chlorides.

When the chlorine liberator and acid are packaged separately the chlorine liberator may simply be compacted and the protective coating applied over the desired portion of its surface so that a substantial part is coated and a substantial part uncoated whereupon when placed in the acid medium, evolution of chlorine will ensue. However, when it is desired to package the chlorine liberator and the acid as a single package, a convenient procedure for the prevention of interaction is by imbedding the chlorine liberator in a low melting point solid, preferably a fatty or waxy solid such as stearic acid, a stearate and paraffin. In this case interaction may be accomplished at the desired time by the application of heat, whereupon at a temperature at which the solid is in a liquid state contact takes place with resultant reaction and evolution of chlorine.

In order to provide the composition in a form from which the desired amount to yield a proper concentration of chlorine for a chamber of certain dimension may be obtained, the chlorine liberator may be prepared in units. Each of these units may be provided with a protective coating over a portion of its surface and a series of such units placed in a single package. The series of units may be so arranged and imbedded in a low melting point solid that each unit is separately separable and the single package of separate units imbedded in the low melting point solid may be provided with a guide or scale, which indicates the points of severance to obtain the proper amount of chlorine for a chamber of given dimensions. By way of illustration, each unit may contain that amount of chlorine liberator which will be capable of evolving chlorine sufficient to give a concentration of five parts per million for one hour in a chamber having a cubical capacity of 100 cubic feet. Further, the mass of these units may be combined into a single elongated mass of desired shape, protecting said mass laterally in part by an inert coating, the whole provided with a guide indicating that proportion of the mass which, on severance from the remainder, will yield a proper therapeutic concentration of chlorine in a therapeutic chamber of indicated or relative proportion.

As illustrative of a manner in which the invention may be carried into practical effect, reference may be had to the accompanying drawing, in which.

In the production of the composition a chlorine liberator, such as hereinbefore described, may be compacted in the form of a cylinder 1. To a portion of the surface of such compacted material there may be applied in any suitable manner a protective coating 2, such as lead foil or shellac. The unit so prepared may then be imbedded or coated over its whole surface with a low melting point solid 3, that is, a solid having a melting point below the boiling point of water, or 100° C., which solid because of ease of obtainment, economy and its low melting point may be paraffin.

Figure 1:
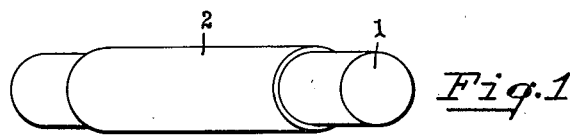
Figure 1 shows a single chlorine liberator unit in side elevation.
Figure 2:
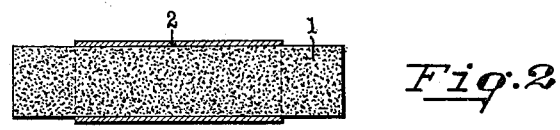
Fig. 2 shows a single chlorine liberator unit in cross section.
Figure 3:
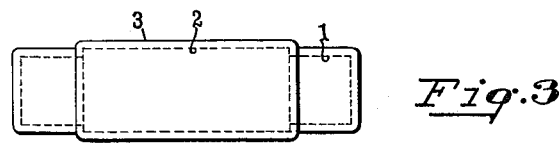
Fig. 3 shows in side elevation a unit of a chlorine liberator imbedded in a low melting point solid.
Figure 4:
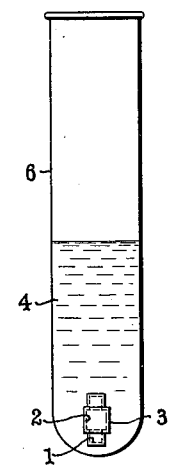
Fig. 4 shows an assembled package.
Figure 5:
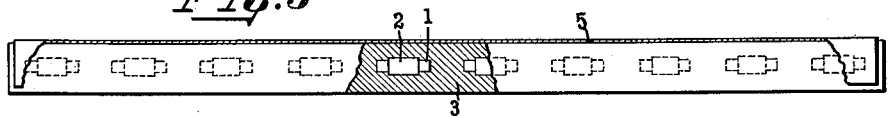
Fig. 5 shows an assembled package consisting of a series of units or a chlorine liberator imbedded in a low melting point solid.

When it is desired to place the composition upon the market in a completed assemblage, Fig. 4, the chlorine liberator is prepared as hereinbefore described and may then be placed in a suitable container, as for example, a glass tube 6 together with an acid medium 4. This unit will remain stable and for utilization requires only removal of the closure and placement in a vessel containing hot water.

Figure 6:
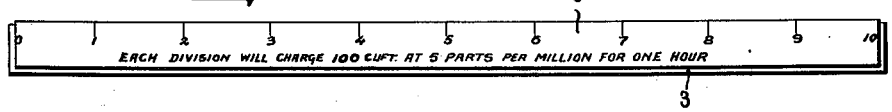
Fig. 6 shows a series of chlorine liberator units as in Fig. 5, together with a guide or scale indicating points of severance.
Figure 7:
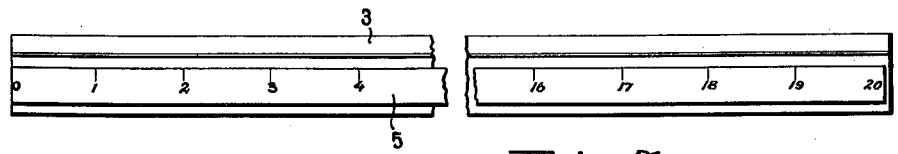
Fig. 7 shows a modification of the form shown in Fig. 6.
Figure 8:
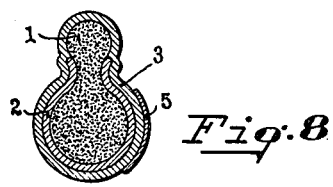
Fig. 8 shows a cross section of the form shown in Fig. 7.

For the purpose of enabling the consumer to choose that amount of the composition which will give and maintain a proper therapeutic concentration for a room of given dimension, a series of chlorine liberator units may be imbedded in a low melting point solid and so arranged therein as to be separately separable, the complete assemblage being provided with a guide or scale 5, Fig. 6, indicating points of severance to give an amount of liberator sufficient for a chamber of certain dimension. This result may also be attained by compacting the chlorine liberator 1, Figs. 7 and 8 into an unitary elongated form of desired cross section and coated in part and in uniform cross section by an inert coating 2, the mass being provided with a guide or scale 5 indicating points of severance to give an amount of liberator sufficient for a chamber of indicated dimension.

The amount of chlorine liberator may be determined from the following: In order to provide a primary therapeutic concentration of 4.7 parts chlorine per million parts of air at standard temperature and pressure, e. g. 0° and 760 mm. in a chamber having a volume of 1000 cubic feet, there is required 146 c. c. of chlorine at 22° C., which may be obtained through the use of a five grain charge, of the chlorine liberator, for example, potassium chlorate when utilized with hydrochloric acid. To maintain the therapeutic concentration for 1 hour requires an addition of 10 grains of the liberator. Accordingly, to produce a primary concentration of 4.7 parts of chlorine per million parts of air and to maintain the same in a chamber of 1000 cubic feet, there is required 15 grains of potassium chlorate when used with hydrochloric acid. When the composition contains constituents other than those enumerated above, the amount of such constituents will be that which is chemically equivalent, and such amount may be determined stochiometrically.

Furthermore, it may be stated that the low melting point solid serving to prevent interaction until the desired time has an added effect at the time of use inasmuch as upon melting, its specific gravity being lower than that of the acid medium, it rises to the surface, coats the same and thereby prevents spillage of the reaction mixture due to foaming or rapid evolution of gas. And in addition by the employment of a solid of given melting point, there is provided an indicator as to that temperature, below which the interaction becomes too slow to maintain a proper therapeutic concentration of chlorine.

It is to be understood that the invention is not directed broadly to the use of chlorine as a therapeutic agent, but is rather directed generically to a mode of procedure and to a composition which will provide a proper therapeutic concentration of chlorine initially and over a proper period of time for therapeutic exposure.

Since certain changes may be made in the above composition and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A process for the liberation of chlorine for therapeutic use which comprises bringing a chlorine liberator having a substantial part of the surface coated and a substantial part uncoated and imbedded in a low melting point solid into interaction with a mineral acid under the influence of heat.

2. A process for the liberation of chlorine for therapeutic use which comprises bringing a chlorine liberator having a substantial part of the surface coated and a substantial part uncoated and imbedded in a low melting point solid into interaction with a mineral acid at a temperature at which the low melting point solid is in a liquid state.

3. A process for the liberation of chlorine for therapeutic use which comprises bringing an oxidizing agent having a substantial part of the surface coated and a substantial part uncoated and imbedded in a low melting point solid into interaction with hydrochloric acid at a temperature at which the low melting point solid is in a liquid state.

4. A process for the liberation of chlorine for therapeutic use which comprises bringing an oxidizing agent having a substantial part of the surface coated and a substantial part uncoated and imbedded in paraffin into interaction with hydrochloric acid at a temperature at which paraffin is in a liquid state.

5. A process for the liberation of chlorine for therapeutic use which comprises bringing potassium chlorate having a substantial part of the surface coated and a substantial part uncoated and imbedded in paraffin into interaction with hydrochloric acid at a temperature at which the paraffin has passed into a liquid state.

6. A process for the liberation of chlorine for therapeutic use which comprises bringing a chlorine liberator having a substantial part of its surface coated and a substantial part uncoated with an inert coating into interaction with a mineral acid.

7. A process for the liberation of chlorine for therapeutic use which comprises bringing a chlorine liberator having a substantial part of its surface coated and a substantial part uncoated with an inert coating into interaction with a mineral acid under the influence of heat.

8. A process for the liberation of chlorine for therapeutic use which comprises bringing an oxidizing agent having a substantial part of its surface coated and a substantial part uncoated with an inert coating into interaction with a hydrochloric acid under the influence of heat.

9. An article of manufacture for use in the administration of chlorine comprising a chlorine liberator having a substantial part of its surface coated and a substantial part uncoated with an inert coating.

10. An article of manufacture for use in the administration of chlorine comprising an oxidizing agent having a substantial portion of its surface coated and a substantial part uncoated with an inert coating.

11. An article of manufacture for use in the administration of chlorine comprising a chlorine liberator having a substantial part of its surface coated and a substantial part uncoated with an inert coating and imbedded in a low melting point solid.

12. An article of manufacture for use in the administration of chlorine comprising a chlorine liberator having a substantial part of its surface coated and a substantial part uncoated with an inert coating and imbedded in a low melting point waxy solid.

13. An article of manufacture for use in the administration of chlorine comprising a chlorine liberator having a substantial part of its surface coated and a substantial part uncoated with an inert coating and imbedded in paraffin.

14. An article of manufacture for use in the administration of chlorine comprising potassium chlorate having a substantial part of its surface coated and a substantial part uncoated with an inert coating.

15. An article of manufacture for use in the administration of chlorine comprising potassium chlorate having a substantial portion of its surface coated and a substantial part uncoated with an inert coating and imbedded in paraffin.

16. An article of manufacture for use in the administration of chlorine comprising a chlorine liberator having a substantial part of its surface coated and a substantial part uncoated with an inert coating imbedded in a low melting point solid, and a mineral acid.

17. An article of manufacture for use in the administration of chlorine comprising potassium chlorate having a substantial part of its surface coated and a substantial part uncoated with an inert coating imbedded in a low melting point solid, and hydrochloric acid.

18. An article of manufacture for use in the administration of chlorine comprising potassium chlorate having a substantial part of its surface coated and a substantial part uncoated and imbedded in a low melting point solid, and hydrochloric acid.

19. An article of manufacture for use in the administration of chlorine comprising potassium chlorate having a substantial part of its surface coated and a substantial part uncoated and imbedded in paraffin, and hydrochloric acid.

20. An article of manufacture for use in the administration of chlorine comprising a chlorine liberator having a substantial part of its surface coated and a substantial part uncoated with an inert coating imbedded in a low melting point solid, said chlorine liberator being present in an amount sufficient to yield an effective therapeutic cencentration when brought into interaction with a mineral acid.

21. An article of manufacture for use in the administration of chlorine comprising a chlorine liberator having a substantial part of its surface coated and a substantial part uncoated with an inert coating imbedded in a low melting point solid, said chlorine liberator being present in an amount sufficient to yield and to maintain an effective therapeutic concentration when brought into interaction with a mineral acid.

22. An article of manufacture for use in the administration of chlorine, consisting of a series of chlorine liberating units, said units comprising a chlorine liberator having a substantial part of its surface coated and a substantial part uncoated with an inert coating, said series of units being imbedded in a low melting point solid and separately separable.

23. An article of manufacture for use in the administration of chlorine, consisting of a series of chlorine liberating units, said units comprising a chlorine liberator having a substantial part of its surface coated and a substantial part uncoated with an inert coating, said series of units being imbedded in a low melting point solid, separately separable and provided with a guide indicating points of severance to obtain an effective therapeutic concentration.

24. An article of manufacture for use in the administration of chlorine consisting of a series of chlorine liberating units, said units comprising potassium chlorate having a substantial part of its surface coated and a substantial part uncoated with an inert coating, said series of units being imbedded in paraffin, separately separable and provided with a guide indicating points of severance to obtain an effective therapeutic concentration in a chamber of given dimension.

25. An article of manufacture for use in the administration of chlorine, comprising, as a liberating unit, an elongated mass of uniform cross section, said mass comprising a chlorine liberator having a substantial part of its surface coated uniformly in cross section by an inert coating and a substantial part uncoated thereby, and a guide indicating proportions of the elongated mass at which severance will yield a sufficient mass to obtain a proper therapeutic concentration of chlorine in a therapeutic chamber of relative proportion.

26. A process for generating chlorine, which comprises bringing a chlorine liberator having a substantial part of its surface coated and a substantial part uncoated into interaction with a mineral acid whereby an immediate action provides a proper primary charge of chlorine, and a further prolonged action provides for chlorine loss due to absorption and escape.

27. An article of manufacture comprising a chlorine liberator having a portion exposed for immediate interaction to yield a proper primary charge of chlorine and having the remaining substantial portion coated with an inert material so that a continued slow evolution of chlorine takes place providing for loss due to absorption and escape.

In testimony whereof I affix my signature.

KARL CONNELL.